(12) United States Patent
Kang et al.

(10) Patent No.: US 11,800,127 B2
(45) Date of Patent: *Oct. 24, 2023

(54) METHOD AND APPARATUS FOR INTRA-PREDICTION CODING OF VIDEO DATA

(71) Applicants: Hyundai Motor Company, Seoul (KR); Kia Corporation, Seoul (KR); Ewha University-Industry Collaboration Foundation, Seoul (KR)

(72) Inventors: Je Won Kang, Seoul (KR); Sang Hyo Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,623

(22) Filed: Jan. 5, 2023

(65) Prior Publication Data
US 2023/0143740 A1 May 11, 2023

Related U.S. Application Data

(63) Continuation of application No. 17/415,489, filed as application No. PCT/KR2020/008206 on Jun. 24, 2020, now Pat. No. 11,589,065.

(30) Foreign Application Priority Data

Jun. 24, 2019 (KR) .................. 10-2019-0075163
Jul. 4, 2019 (KR) .................. 10-2019-0080749
Jun. 24, 2020 (KR) .................. 10-2020-0077014

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11);
(Continued)

(58) Field of Classification Search
CPC .. H04N 19/159; H04N 19/132; H04N 19/176; H04N 19/593; H04N 19/70
See application file for complete search history.

(56) References Cited

U.S. PATENT DOCUMENTS 9,350,993 B2   5/2016   Lee et al.
10,326,986 B2  6/2019   Zhang et al.
(Continued)

FOREIGN PATENT DOCUMENTS

JP   2022-529763 A   6/2022
JP   2022-536383 A   8/2022
(Continued)

OTHER PUBLICATIONS

"Enhanced Intra Prediction Mode Coding by using Reference Samples"—Promila Agarwal, Mingiang Jiang, Nam Ling, Jianhua Zheng, Philipp Zhang; 2018 IEEE International Workshop on Signal Processing Systems (SiPS) (Year: 2018).*
(Continued)

*Primary Examiner* — Mainul Hasan
(74) *Attorney, Agent, or Firm* — Fox Rothschild LLP

(57) ABSTRACT

A method and apparatus for intra-prediction coding of video data are provided. The apparatus includes a decoder that is configured to decode, from a bitstream, a syntax element indicating an intra-prediction type of a current block of the video data, and an intra-predictor that is configured to
(Continued)

generate a prediction block for the current block by selectively performing matrix based intra-prediction or regular intra-prediction based on the intra-prediction type of the current block indicated by the syntax element.

11 Claims, 14 Drawing Sheets

(51) Int. Cl.
  *H04N 19/132* (2014.01)
  *H04N 19/159* (2014.01)
  *H04N 19/176* (2014.01)
  *H04N 19/70* (2014.01)

(52) U.S. Cl.
  CPC ......... *H04N 19/159* (2014.11); *H04N 19/176* (2014.11); *H04N 19/70* (2014.11)

(56) References Cited

U.S. PATENT DOCUMENTS

| | | | |
|---|---|---|---|
| 11,589,065 B2* | 2/2023 | Kang | H04N 19/70 |
| 2018/0048889 A1 | 2/2018 | Zhang et al. | |
| 2018/0160113 A1 | 6/2018 | Jeong et al. | |
| 2020/0322620 A1* | 10/2020 | Zhao | H04N 19/44 |
| 2020/0344468 A1* | 10/2020 | Lin | H04N 19/105 |
| 2020/0359033 A1* | 11/2020 | Ramasubramonian | H04N 19/463 |
| 2020/0359050 A1* | 11/2020 | Van der Auwera | H04N 19/42 |
| 2020/0396459 A1* | 12/2020 | Lin | H04N 19/11 |
| 2021/0297671 A1* | 9/2021 | Deng | H04N 19/176 |
| 2021/0321090 A1* | 10/2021 | Deng | H04N 19/60 |
| 2021/0344915 A1 | 11/2021 | Wang et al. | |
| 2022/0078450 A1* | 3/2022 | Salehifar | H04N 19/593 |
| 2022/0174272 A1 | 6/2022 | Choi et al. | |
| 2022/0191512 A1* | 6/2022 | Choi | H04N 19/186 |
| 2023/0119780 A1 | 4/2023 | Choi et al. | |

FOREIGN PATENT DOCUMENTS

| | | | |
|---|---|---|---|
| KR | 10-2016-0143588 A | 12/2016 | |
| KR | 10-1822474 B1 | 3/2018 | |
| KR | 10-2018-0086094 A | 7/2018 | |
| KR | 10-2019-0033559 A | 3/2019 | |
| WO | WO-2020239018 A1 * | 12/2020 | G06F 17/16 |
| WO | WO-2020246805 A1 * | 12/2020 | H04N 19/132 |

OTHER PUBLICATIONS

Written Opinion dated Sep. 25, 2020 in corresponding PCT Application No. PCT/KR2020/008206.
International Search Report dated Sep. 25, 2020 in corresponding PCT Application No. PCT/KR2020/008206.
Extended European Search Report for European Patent Application No. 20831610, dated Jan. 16, 2023, 11 pages.
Chen, J. et al., "Algorithm description for Versatile Video Coding and Test Model 5 (VTM 5)", Joint Video Experts Team (JVET) of ITu-T SG 16 WP 3 and ISO/IEC JTC 1/SC 29/WG 11, 14th Meeting: Geneva, CH (Mar. 19-27, 2019) Document: JVET-N1002-v2, 76 pages.
Japanese Office Action for Japanese Patent Application No. 2021-577013 dated Mar. 24, 2023,13 pages with English translation.

* cited by examiner

METHOD AND APPARATUS FOR INTRA-PREDICTION CODING OF VIDEO DATA

CROSS-REFERENCE TO RELATED APPLICATION

This Application is a Continuation of application Ser. No. 17/415,489 filed on Jun. 17, 2021. Application Ser. No. 17/415,489 is a 371 of International Patent Application No. PCT/KR2020/008206, filed Jun. 24, 2020, which claims priority to Patent Application No. 10-2019-0075163 filed in Korea on Jun. 24, 2019, Patent Application No. 10-2019-0080749 filed in Korea on Jul. 4, 2019, and Patent Application No. 10-2020-0077014 filed in Korea on Jun. 24, 2020, the entire contents of each of which are incorporated herein by reference.

TECHNICAL FIELD

The present disclosure relates to encoding and decoding of video data.

BACKGROUND

Since the volume of video data is greater than that of voice data or still image data, storing or transmitting video data without processing for compression requires a lot of hardware resources including memory. Accordingly, in storing or transmitting video data, the video data is generally compressed using an encoder to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the picture size, resolution, and frame rate are gradually increasing, and accordingly the amount of data to be encoded is also increasing. Accordingly, a new compression technique having better encoding efficiency and higher image quality than the existing compression technique is required.

SUMMARY

The present disclosure presents improved techniques for intra-prediction coding of a block of video data.

In accordance with one aspect of the present disclosure, a method of decoding video data, is provided including decoding, from a bitstream, a syntax element indicating an intra-prediction type of a current block of the video data, the intra-prediction type being indicated from among matrix based intra-prediction (MIP) and regular intra-prediction; and generating a prediction block for the current block by selectively performing the MIP or the regular intra-prediction based on the intra-prediction type of the current block indicated by the syntax element.

As a part of the generating of the prediction block for the current block by performing the regular intra-prediction, the method includes deriving Most Probable Mode (MPM) candidates based on a regular intra-prediction mode of each of neighboring blocks adjacent to the current block and configuring an MPM list for the current block; and deriving a regular intra-prediction mode for the current block based on the MPM list. When an intra-prediction type of the neighboring blocks is the MIP, the regular intra-prediction mode of the neighboring block is set as a PLANAR mode.

As a part of the generating of the prediction block for the current block by performing the regular intra-prediction, the method includes decoding, from the bitstream, a syntax element indicating an MIP mode for the current block; deriving a boundary vector using neighboring samples adjacent to the current block based on a size and shape of the current block; generating predicted samples for the current block based on matrix-vector multiplication between the boundary vector and a matrix predefined for the MIP mode; and deriving the prediction block for the current block based on the predicted samples.

In accordance with another aspect of the present disclosure, an apparatus for decoding video data is provided, including a decoder configured to decode, from a bitstream, a syntax element indicating an intra-prediction type of a current block of the video data, the intra-prediction type being indicated from among matrix based intra-prediction (MIP) and regular intra-prediction; and an intra-predictor configured to generate a prediction block for the current block by selectively performing the MIP or the regular intra-prediction based on the intra-prediction type of the current block indicated by the syntax element.

As a part of the generating of the prediction block for the current block by performing the regular intra-prediction, the intra-predictor is configured to derive Most Probable Mode (MPM) candidates based on a regular intra-prediction mode of each of neighboring blocks adjacent to the current block and configure an MPM list for the current block; and derive a regular intra-prediction mode for the current block based on the MPM list. In deriving the MPM candidates, when an intra-prediction type of the neighboring blocks is the MIP, the intra-predictor sets (regards) the regular intra-prediction mode of the neighboring block as a PLANAR mode.

As a part of the generating of the prediction block for the current block by performing the regular intra-prediction, the intra-predictor may decode, from the bitstream, a syntax element indicating an MIP mode for the current block; derive a boundary vector using neighboring samples adjacent to the current block based on a size and shape of the current block; generate predicted samples for the current block based on matrix-vector multiplication between the boundary vector and a matrix predefined for the MIP mode; and derive the prediction block for the current block based on the predicted samples.

DETAILED DESCRIPTION

Figure 1:
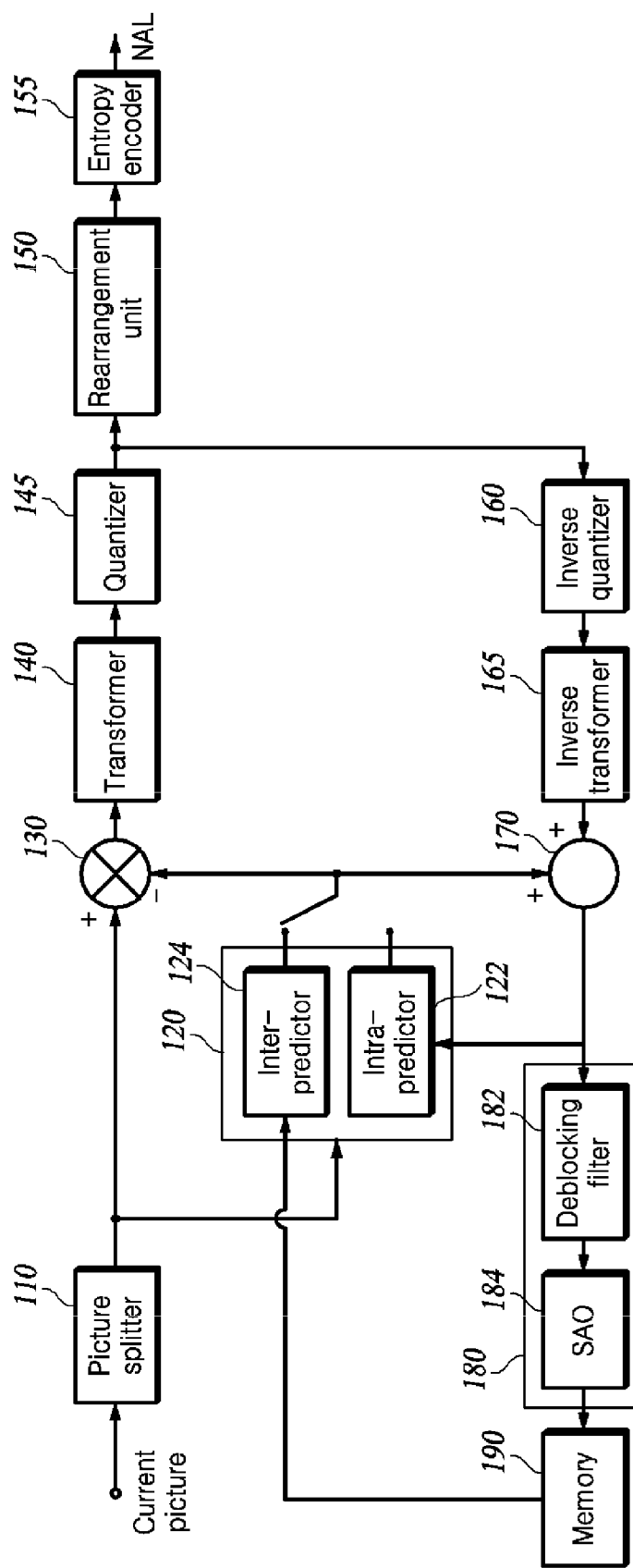
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Particularly, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 is configured to determine the size of a coding tree unit (CTU). Information about the size of the CTU (CTU size) is encoded as a syntax of the SPS or PPS and is transmitted to the video decoding apparatus. The picture splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
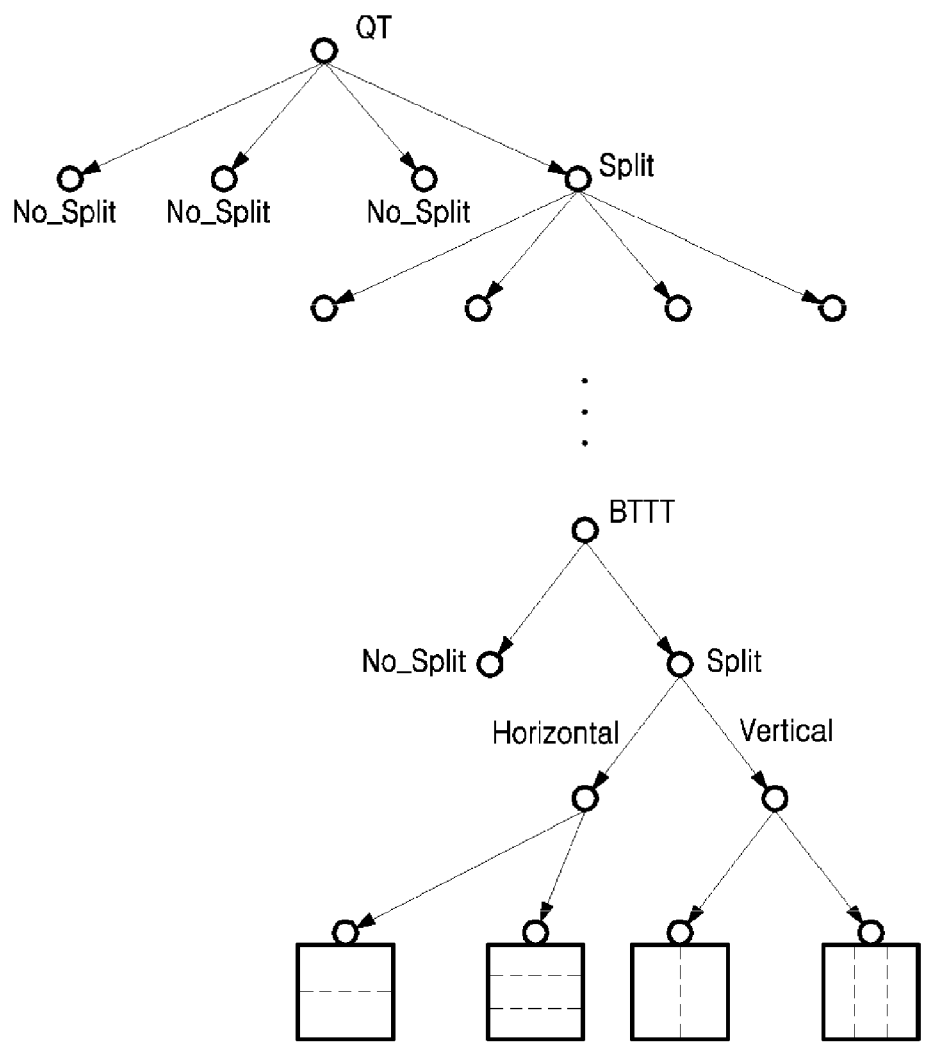
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is less than the maximum block size (MaxBTSize) of the root node allowed in the BT, it may be further split into one or more of the BT structure or the TT structure. The BT structure and/or the TT structure may have a plurality of splitting directions.

For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular. The predictor 120 predicts the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
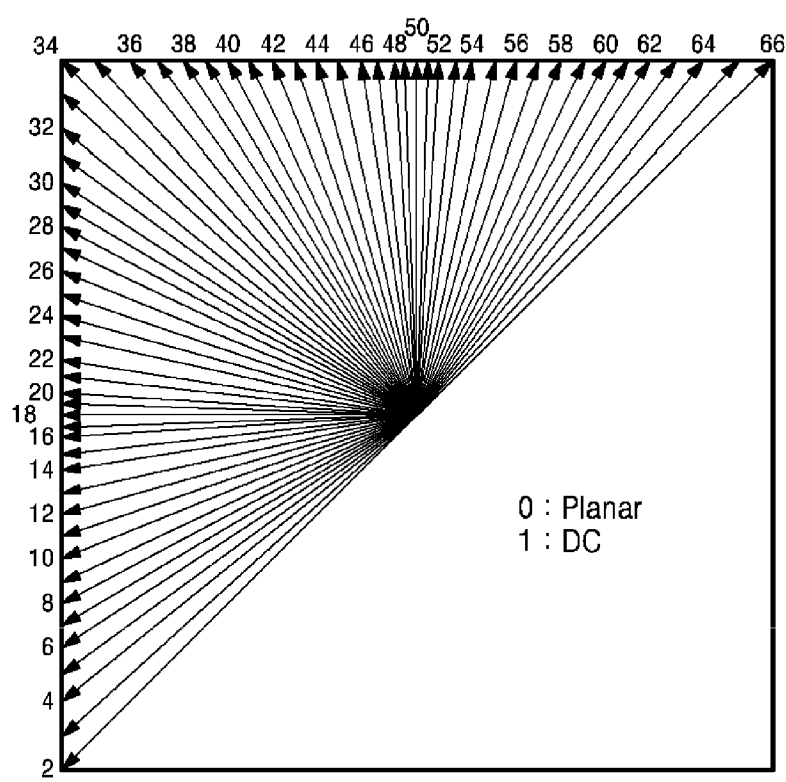
FIG. 3A exemplarily shows a plurality of intra-prediction modes.

The intra-prediction unit 122 is configured to predict pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |

Figure 3B:
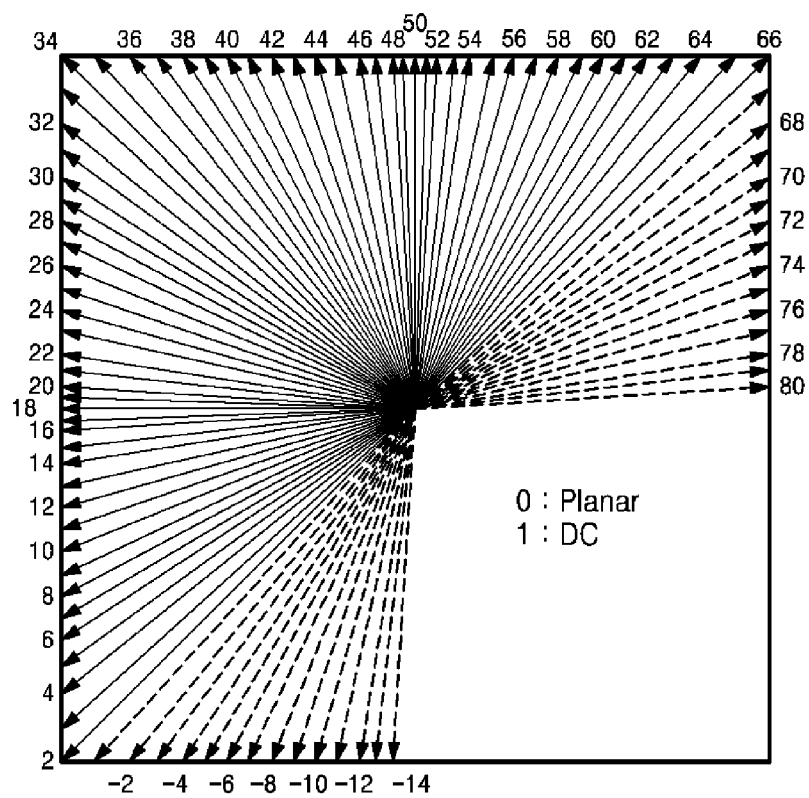
FIG. 3B exemplarily shows a plurality of intra prediction modes including wide-angle intra prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape.

In particular, among the wide angle intra-prediction modes, some wide angle intra-prediction modes available for the current block may be determined based on a ratio of the width and height of the rectangular current block. For example, wide angle intra-prediction modes with an angle less than about 45 degrees (intra prediction modes 67 to 80) may be used when the current block has a rectangular shape with a height less than the width thereof. Wide angle intra-prediction modes with an angle greater than about −135 degrees (intra-prediction modes −1 to −14) may be used when the current block has a rectangular shape with height greater than the width thereof.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and may be configured to select an intra-prediction mode that has the best rate distortion characteristics among the tested modes.

The intra-predictor 122 is configured to select one intra-prediction mode from among the plurality of intra-prediction modes, and predict the current block using neighboring pixels (reference pixels) and an equation determined according to the selected intra-prediction mode. Information about the selected intra-prediction mode is encoded by the entropy encoder 155 and transmitted to the video decoding apparatus. In addition, the intra-predictor 122 may be configured to generate a prediction block for the current block, using matrix-based intra-prediction (MIP), which will be described later. The intra-predictor 122 is configured to generate a prediction block for the current block using a boundary vector derived from samples reconstructed on the left side of the current block and samples reconstructed above the current block, a predefined matrix, and an offset vector.

Additionally, the inter-predictor 124 is configured to generate a prediction block for the current block through motion compensation. The inter-predictor 124 is configured to search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 is configured to subtract the prediction block generated by the intra-predictor 122 or the inter-predictor 124 from the current block to generate a residual block. The transformer 140 may be configured to split the residual block into one or more transform blocks, and apply the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. In addition, the transformer 140 may be configured to partition the residual block into two sub-blocks in a horizontal or vertical direction, and may be configured to transform only one of the two sub-blocks. Accordingly, the size of the transform block may be different from the size of the residual block (and thus the size of the prediction block). Non-zero residual sample values may not be present or may be very rare in the untransformed subblock. The residual samples of the untransformed subblock are not signaled, and may be regarded as "0" by the video decoding apparatus. There may be multiple partition types according to the partitioning direction and partitioning ratio. The transformer 140 may provide information about the coding mode (or transform mode) of the residual block (e.g., information indicating whether the residual block is transformed or the residual subblock is transformed, and information indicating the partition type selected to partition the residual block into subblocks, and information identifying a subblock that is transformed is performed) to the entropy encoder 155. The entropy encoder 155 may be configured to encode the information about the coding mode (or transform mode) of the residual block.

The quantizer 145 is configured to quantize transform coefficients output from the transformer 140, and output the quantized transform coefficients to the entropy encoder 155. For some blocks or frames, the quantizer 145 may be configured to directly quantize a related residual block without transformation. The rearrangement unit 150 may be configured to rearrange the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 is configured to encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 is configured to encode information about a prediction type indicating whether the current block is encoded by intra-prediction or inter-prediction, and encode intra-prediction information (i.e., information about an intra-prediction mode) or inter-prediction information (information about a reference picture index and a motion vector) according to the prediction type.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstruct the residual block. The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184. The deblocking filter 180 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding. The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
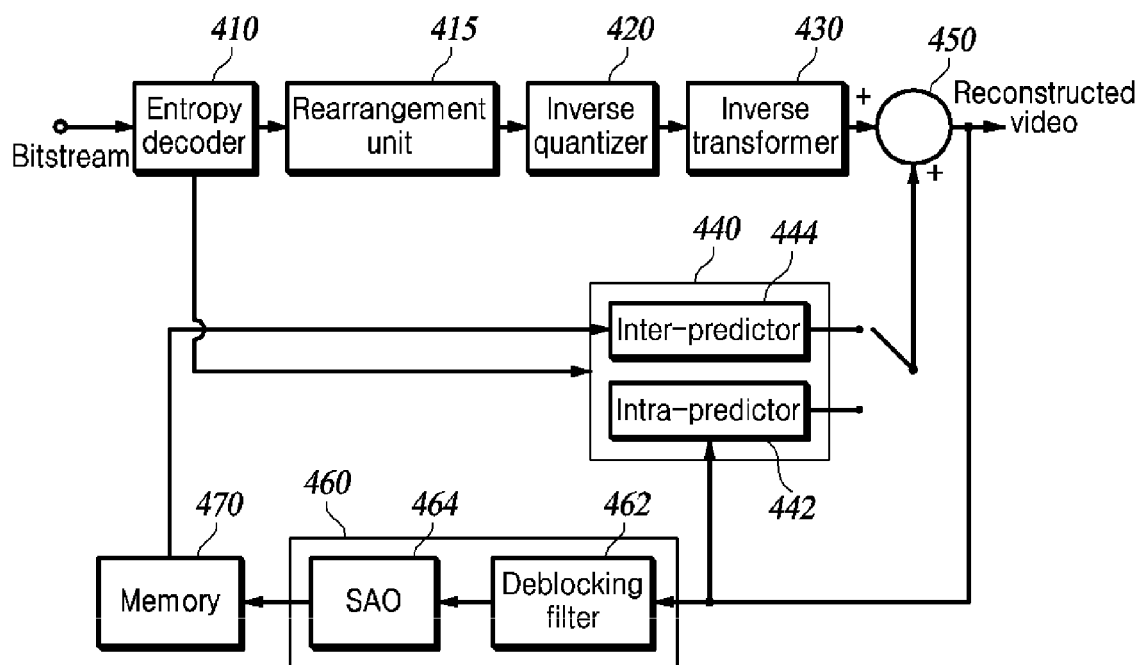
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4. The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extracting information related to block splitting, and extract prediction information and information about a residual signal, and the like required to reconstruct the current block. The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times. As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is configured to extract information about the coding mode of the residual block (e.g., information about whether the residual block is encoded only a subblock of the residual block is encoded, information indicating the partition type selected to partition the residual block into subblocks, information identifying the encoded residual subblock, quantization parameters, etc.) from the bitstream. The entropy decoder 410 is also configured to extract information about quantized transform coefficients of the current block as information about the residual signal.

The rearrangement unit 415 may be configured to change the sequence of the one-dimensional quantized transform coefficients entropy-decoded by the entropy decoder 410 to a 2-dimensional coefficient array (i.e., block) in a reverse order of the coefficient scanning performed by the video encoding apparatus. The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals, thereby generating a reconstructed residual block for the current block When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block.

When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction. The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode. In addition, the intra-predictor 442 may be configured to generate a prediction block for the current block, using matrix-based intra-prediction (MIP), which will be described later. The intra-predictor 442 may be configured to generate a prediction block for the current block using a boundary vector derived from samples reconstructed on the left of the current block and samples reconstructed on the above of the current block, and a predefined matrix and offset vector.

The inter-predictor 444 is configured to determine a motion vector of the current block and a reference picture referred to by the motion vector using the syntax element for the intra-prediction mode extracted from the entropy decoder 410, and predict the current block based on the motion vector and the reference picture. The adder 450 is configured to reconstruct the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 is configured to perform additional filtering on the reconstructed block after deblocking filtering to corresponding offsets to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The techniques of the present disclosure generally are related to intra-prediction coding. The following description is mainly focused on decoding techniques, that is, the operations of the video decoder. The encoding techniques are briefly described because they are opposite to the decoding techniques that are comprehensively described.

In the discussion of the Next-Generation Video Coding standard (i.e., Versatile Video Coding (VVC)), several new coding tools enabling better coding performance than the High Efficiency Video Coding (HEVC) have been introduced. Multiple Transform Selection (MTS), which is a technique introduced in VVC, relies on three trigonometric transforms including DCT-2, DST-7 and DCT-8, and the video encoder may be configured to select horizontal and vertical transform, which minimizes rate-distortion cost.

TABLE 2

| Transform Type | Basis function $T_i(j)$, i, j = 0, 1, . . . , N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ |

TABLE 2-continued

| Transform Type | Basis function $T_i(j)$, $i, j = 0, 1, \ldots, N - 1$ |
|---|---|
| DCT-VIII | where, $\omega_0 = \begin{cases} \sqrt{\frac{2}{N}} & i = 0 \\ 1 & i \neq 0 \end{cases}$ $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

For a block to which MTS is applied, one or more syntax elements may be coded to signal which transform kernels are used, respectively, in the horizontal direction and the vertical direction.

As an example, three flags (MTS_CU_flag, MTS_Hor_flag, MTS_Ver_flag) may be used together with a predefined mapping table such as Table 3.

TABLE 3

| | | | Intra/inter | |
|---|---|---|---|---|
| MTS_CU_flag | MTS_Hor_flag | MTS_Ver_flag | Horizontal | Vertical |
| 0 | — | — | DCT2 | DCT2 |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

First, one flag (MTS_CU_flag) indicating whether DCT-2 is used in both the horizontal direction and the vertical direction may be signaled. When DCT-2 is not applied in both directions, one flag (MTS_Hor_flag) indicating a transform kernel to be applied in the horizontal direction between DST-7 and DCT-8 may be signaled, and one flag (MTS_Ver_flag) indicating a transform kernel to be applied in the vertical direction between DST-7 and DCT-8 may be signaled. DST-7 and DCT-8 may be used for a block size of up to 32×32, and DCT-2 may be used for a block size of up to 64×64. Accordingly, MTS_CU_flag may be signaled when the size (width and height) of the block is less than or equal to 32, and the block has at least one non-zero residual signal. When MTS_CU_flag is not present, MTS_CU_flag may be inferred to be 0.

Alternatively, a syntax element (tu_mts_idx) indicating an MTS kernel index may be used together with a predefined mapping table such as Table 4. Additionally, tu_mts_idx indicates an MTS kernel index, and kernels for the horizontal and vertical directions are selected according to each index value. In Table 4, trTypeHor and trTypeVer indicate the types of kernels for the horizontal and vertical directions. In particular, 0 represents DCT-2, 1 represents DST-7, and 2 represents DCT-8. For example, when tu_mts_idx=2, DCT-8 is used in the horizontal direction and DST-7 is used in the vertical direction.

TABLE 4

| tu_mts_idx | 0 | 1 | 2 | 3 | 4 |
|---|---|---|---|---|---|
| trTypeHor | 0 | 1 | 2 | 1 | 7 |
| trTypeVer | 0 | 1 | 1 | 2 | 2 |

Further, tu_mts_idx is signaled only when sps_explicit_mts_enabled_flag in the SPS is 1. This is called ExplicitMTS because it explicitly signals the MTS index. On the other hand, tu_mts_idx may not be explicitly indicated, but may be implicitly derived by the encoder and the decoder, and this is called ImplicitMTS. ImplicitMTS may be performed when sps_explicit_mts_enabled_flag in the SPS is 0. When ImplicitMTS is used, the selection of a transform kernel may be performed based on information such as an intra-prediction mode, an inter-prediction mode employed for a block, and a size of the block. For example, when the width of the block is greater than or equal to 4 and less than or equal to 16, DST-7 is used as a kernel for the horizontal direction. Otherwise, DCT-2 is used. In addition, when the height of the block is greater than or equal to 4 and less than or equal to 16, DST-7 is used as a kernel for the vertical direction. Otherwise, DCT-2 is used. In other words, when the block size is small, the DST-7 is used because the directionality of the prediction residual signals may be high. For a relatively large block, DCT-2 may be used as a kernel because the characteristic of the residual signals that are rather uniform is strong.

Table 5 shows a part of the transform unit syntax specified in VVC draft 5. In the syntax below, highlighting elements in gray is intended to provide understanding.

TABLE 5

| | Descriptor |
|---|---|
| transform_unit( x0, y0, tbWidth, tbHeight, treeType, subTuIndex ) { | |
| (omitted) | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT ) && ( !cu_sbt_flag ) ) { | |
|     if( transform_skip_enabled_flag && tbWidth <= MaxTsSize && tbHeight <= MaxTsSize ) | |
|       transform_skip_flag[ x0 ][ y0 ] | ae(v) |
|     if( (( CuPredMode[ x0 ][ y0 ] != MODE_INTRA && sps_explicit_mts_inter_enabled_flag ) | |
|       \|\| ( CuPredMode[ x0 ][ y0 ] = = MODE_INTRA && sps_explicit_mts_intra_enabled_flag )) | |
|       && ( !transform_skip_flag[ x0 ][ y0 ] ) ) | |
|       tu_mts_idx[ x0 ][ y0 ] | ae(v) |
|   } | |
|   if( tu_cbf_luma[ x0 ][ y0 ] ) { | |
|     if( !transform_skip_flag[ x0 ][ y0 ] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
| (omitted) | |

A transform block may be coded without a transform operation, which is indicated by the syntax element transform_skip_flag signaled for a transform block having at least one non-zero coefficient. High-level control of the coding mode of the transform block is achieved by transform_skip_enabled_flag and log 2_transform_skip_max_size_minus2, which are elements in High-Level Syntax (HLS) such as Sequential Parameter Set (SPS). When transform_skip_enabled_flag is 1, transform_skip_flag is coded for a transform block whose height and width are less than or equal to "1<<(log 2_transform_skip_max_size_minus2+2)". When transform_skip_flag is 1, the associated transform block is coded in the transform skip mode. Otherwise, the MTS-based transform may be applied to the associated transform block.

Matrix-based Intra-prediction (MIP) is a new intra-prediction technique introduced in VTM 5.0. The original idea is to use a neural network-based intra-prediction technique, that is, to use a multilayer neural network to predict current PU pixel values based on adjacent reconstructed pixels. However, due to the high complexity of the prediction method using the neural network, an intra-prediction technique based on affine linear transform using pre-trained matrices has been introduced.

To predict a rectangular block PU with a width W and a height H, the MIP takes as inputs H reconstructed samples on the left of the block and W reconstructed samples on the above of the block. The final predicted pixels are obtained by averaging, matrix-vector multiplication, linear interpolation, and the like. The sizes of blocks to which MIP is applied are classified into three categories as follows.

$$idx(W, H) = \begin{cases} 0 & \text{for } W = H = 4 \\ 1 & \text{for } \max(W, H) = 8 \\ 2 & \text{for } \max(W, H) > 8 \end{cases}$$

According to idx(W, H), the number of MIP modes (numModes), boundary size (boundarySize), and prediction block size (predW, predH, predC) are defined as follows. In the table below, MipSizeId=idx(W, H).

TABLE 6

| MipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min(nTbW, 8) | Min(nTbH, 8) | 8 |

Figure 5:
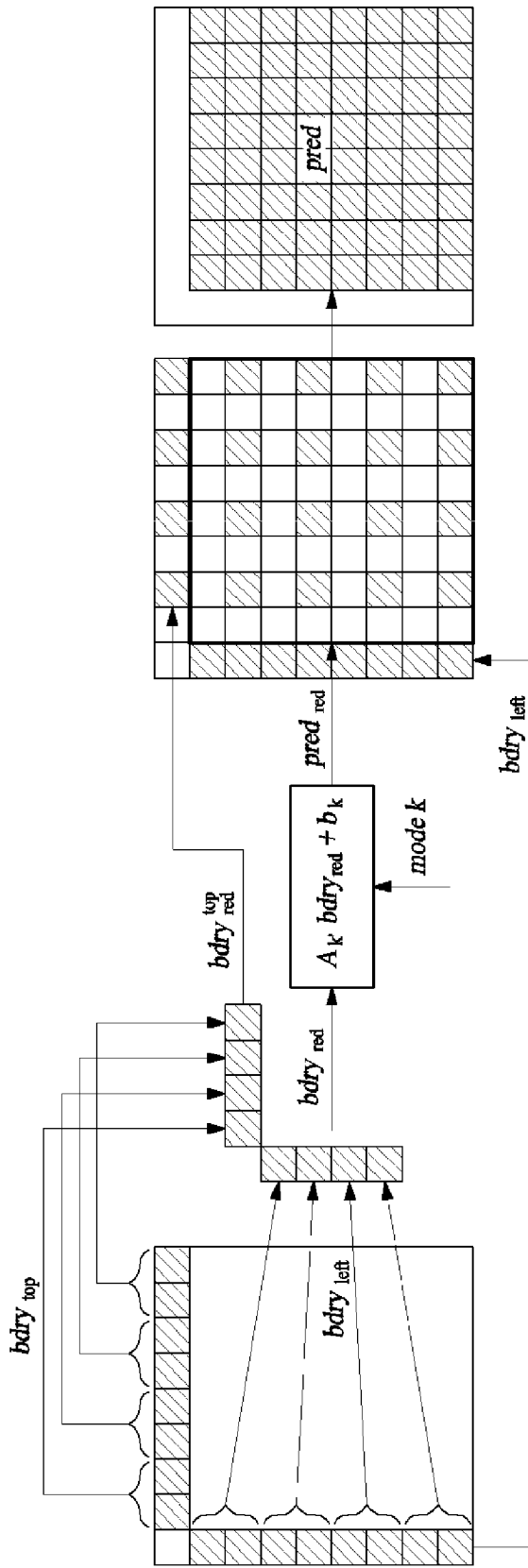
FIG. 5 is a conceptual diagram illustrating the main process of MIP technology that may be used in the techniques of the present disclosure.

FIG. 5 is a conceptual diagram illustrating the main processes of MIP technology that may be used in the techniques of the present disclosure.

(1) Averaging

The main purpose of this process is to normalize the reference samples. Depending on the block size and shape (i.e., MipSizeId), 4 or 8 samples are obtained. When both the width and height of the current block are 4 (i.e., W=H=4), 4 samples in total, including 2 from the left and 2 from the above, are obtained (boundarySize=2). In the other case, 8 samples in total, including 4 from the left and 4 from the above, are obtained (boundary Size=4).

As shown in FIG. 5, the above neighboring samples are denoted by $bdry^{top}$ and the left neighboring samples are denoted by $bdry^{left}$. By performing the averaging on $bdry^{top}$ and $bdry^{left}$, respectively, down-sampled sample sets $bdry_{red}^{top}$ and $bdry_{red}^{left}$ red are obtained. The averaging is a downsampling process as follows.

$$redS[x] = \left( \sum_{i=0}^{bDwn-1} refS[x*bDwn + i] + (1 \ll (\log2(bDwn) - 1)) \right) \gg Log2(bDwn)$$

In the equation above, bDwn denotes a downsampling scale value (nTbs/boundarySize), and refS denotes an original reference sample. The calculated redS is stored as $bdry_{red}^{left}$ for the left neighbors as $bdry_{red}^{top}$ for the above neighbors.

The down-sampled reference samples are stitched into a vector of length 4 or 8. The reduced boundary vector $bdry_{red}$ input to the vector-matrix multiplication is defined as the equation below. For example, when W=H=4 and the MIP mode is less than 18, the boundary vector is constructed by stitching in order of $bdry_{red}^{left}$ and $bdry_{red}^{top}$. When W=H=4 and the MIP mode is greater than or equal to 18, they are stitched in order of $bdry_{red}^{left}$ and $bdry_{red}^{top}$. In the following equation, "mode" denotes the MIP mode.

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases}$$

(2) Matrix-Vector Multiplication

In this process, a down-sampled prediction signal $pred_{red}$ of the current block is generated from the reduced boundary vector $bdry_{red}$. $pred_{red}$ is the sum of the matrix-vector product and the offset and is calculated as follows.

$$pred_{red} = A \cdot bdry_{red} + b$$

The size of $pred_{red}$ is $W_{red} \times H_{red}$. $W_{red}$ and $H_{red}$ are defined according to the size and shape of the current block as shown below. Matrix A has rows as many as $W_{red} * H_{red}$, and has 4 columns when W=H=4 or 8 columns in the other cases. The offset vector b is a vector of size $W_{red} * H_{red}$.

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

Sets $S_0$, $S_1$, and $S_2$ of the matrix A and the offset vector b that may be used for the block are predefined for each category of block sizes. The indices (0, 1, 2) of the set S are selected according to the aforementioned MipSizeId (i.e., idx(W, H)), and the matrix A and the offset vector b are extracted from one of the sets $S_0$, $S_1$, and $S_2$ according to the MIP mode applied to the current block.

The set $S_0$ consists of 18 matrices $A_0$ each having 16 rows and 4 columns, and 18 16-dimensional offset vectors $b_0$, and is used for a 4×4 block. The set $S_1$ consists of 10 matrices $A_1$ each having 16 rows and 8 columns and 10 16-dimensional offset vectors $b_1$, and is used for blocks of 4×8, 8×4 and 8×8 sizes. Finally, the set $S_2$ consists of 6 matrices $A_2$ each having 64 rows and 8 columns and 6 64-dimensional offset vectors $b_2$, and is used for all other block shapes.

(3) Pixel Interpolation

Interpolation is an upsampling process. As mentioned above, $pred_{red}$ is a down-sampled prediction signal of the original block. In particular, a down-sampled prediction block with a size of predW and predH is defined as follows.

$$pred_{red}[x][y], \text{ with } x=0 \ldots predW\ 1, y=0 \ldots predH-1$$

A prediction block having an original block size (nTbW, nTbH) generated by linearly interpolating the prediction signal at the remaining position in each direction is defined as follows.

$$predSamples[x][y], \text{ with } x=0 \ldots nTbW-1, y=0 \ldots nTbH-1$$

Depending on the horizontal and vertical upsampling scale factors upHor(=nTbW/predW) and upVer (=nTbH/predH), some or all of the predSamples are filled from $pred_{red}$ as follows.

$$predSamples[(x+1)*upHor-1][(y+1)*upVer-1]=pred_{red}[x][y]$$

When upHor=1, all horizontal positions of predSamples from $pred_{red}$ are filled. When upVer=1, all vertical positions of predSamples from $pred_{red}$ are filled.

Thereafter, the remaining empty samples of predSamples are filled through bi-linear interpolation. Interpolation in the horizontal direction and interpolation in the vertical direction are upsampling processes. For interpolation of left and top samples in predSamples, down-sampled samples $bdry_{red}^{top}$ are assigned to values of predSamples [x][-1], and original reference samples on the left are assigned to values of predSamples[-1][y].

(4) Signaling of MIP Intra-Prediction Mode

For each coding unit (CU) subjected to intra-prediction coding, a flag indicating whether a matrix-based intra-prediction mode (i.e., MIP mode) is applied is transmitted. In VVC draft 5, for signaling the MIP mode, the MPM list is used in the same manner as the traditional intra-prediction mode (hereinafter, "regular intra-prediction mode") which is different from the matrix-based intra-prediction. For example, intra_mip_mpm_flag, intra_mip_mpm_idx, and intra_mip_mpm_remainder are used for MIP mode signaling. intra_mip_mpm_idx is coded with a truncated binary code, and intra_mip_mpm_remainder is coded with a fixed length code.

Depending on the size of the coding block (CU), up to 35 MIP modes may be supported. For example, for a CU with max (W, H)<=8 and W*H<32, 35 modes are available. In addition, 19 prediction modes and 11 prediction modes are used for CUs with max(W, H)=8 and max(W, H)>8, respectively. In addition, a pair of modes (i.e., two modes) may share a matrix and offset vector to reduce memory requirements. The specific sharing mode is calculated as follows. For example, for a 4×4 coding block, mode 19 uses a transposed matrix of the matrix assigned to mode 2.

$$m = \begin{cases} \text{mode} & \text{for } W = H = 4 \text{ and mode} < 18 \\ \text{mode}-17 & \text{for } W = H = 4 \text{ and mode} \geq 18 \\ \text{mode} & \text{for max}(W, H) = 8 \text{ and mode} < 10 \\ \text{mode}-9 & \text{for max}(W, H) = 8 \text{ and mode} \geq 10 \\ \text{mode} & \text{for max}(W, H) > 8 \text{ and mode} < 6 \\ \text{mode}-5 & \text{for max}(W, H) > 8 \text{ and mode} \geq 6 \end{cases}$$

When there is a block to which MIP is applied adjacent to a block to which a regular intra-prediction other than MIP is applied (hereinafter referred to as a "regular block"), a mapping table defined between the MIP modes and the regular modes may be used for MPM derivation of the regular block. The mapping table is used to derive a regular mode of similar characteristics from the MIP mode of the neighboring block to which MIP is applied. The regular mode derived in this way is used for MPM derivation of the regular block. Similarly, even when MIP is applied to a collocated luma block used in chroma DM derivation, a regular mode of the collocated luma block is derived using the mapping table and the derived regular mode is used for chroma DM derivation. The equation below expresses the mapping between the regular modes and the MIP modes using the mapping table.

$$predmode_{MIP}=\text{map\_regular\_to\_mip}_{idx}[predmode_{regular}]$$

$$predmode_{regular}=\text{map\_mip\_to\_regular}_{idx}[predmode_{MIP}]$$

As described above, in VVC draft 5, when a block is predicted based on MIP, reconstructed neighboring samples $bdry^{left}$ on the left of the block and reconstructed neighboring samples $bdry^{top}$ on the above of the block are always used as reference samples. This approach may deteriorate prediction performance in the case of a block in which the texture of the block has directional characteristics. In addition, in VVC draft 5, for interpolation of top samples in predSamples, the down-sampled sample set $bdry_{red}^{top}$ is allocated to values of predSamples[x][-1] as shown in FIG. 5, thereby making the interpolation process more complex than necessary. Furthermore, in VVC draft 5, as the MPM list is employed for signaling both the MIP mode and the regular mode, the implementation may be very complicated due to many checks and conditions such as a requirement for mapping between the MIP modes and the regular modes.

In view of the above, the present disclosure presents some improved techniques for MPM coding. According to an aspect of the present disclosure, an approach is provided that may reduce the implementation complexity of the MIP mode and take into account a directional characteristic that a texture of a block may have.

Figure 6:
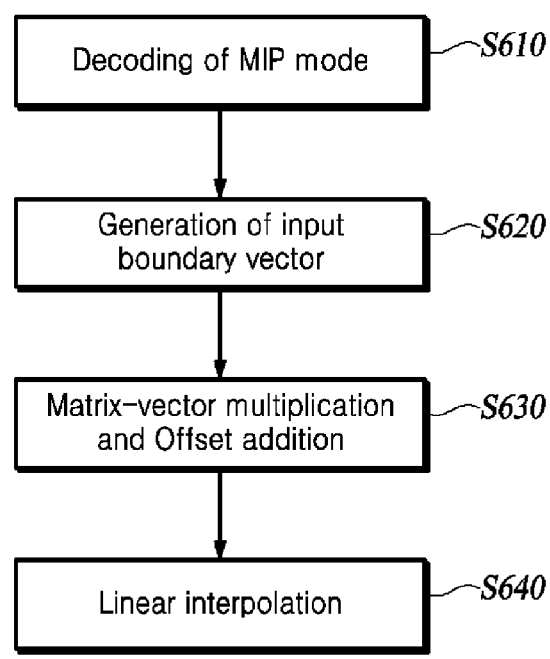
FIG. 6 is a flowchart illustrating a schematic process of predicting a block based on MIP according to an embodiment of the present disclosure.

FIG. 6 is a flowchart illustrating a schematic process of predicting a block based on MIP according to an embodiment of the present disclosure.

1. Decoding of MIP Mode (S610)

For a CU coded in intra-prediction mode, the video decoder decodes a flag indicating whether the intra-prediction type is MIP. When MIP is applied to a current CU, the video decoder decodes a syntax element which indicates a MIP mode used in the current CU from among a plurality of available MIP modes.

Unlike the traditional intra-prediction mode (i.e., regular intra-prediction mode), the MPM list may not be used for signaling the MIP mode. Instead, for example, one syntax element (e.g., intra_mip_mode) that may be coded with a truncated binary code and indicates an MIP mode used in the current CU among the plurality of MIP modes may be used. A portion of an exemplary coding unit syntax proposed based on the VVC draft 5 is provided below. In the syntax below, the graying of elements is used to provide understanding.

TABLE 7

```
if( CuPredMode[ x0 ][ y0 ] = = MODE_INTRA ) {
  if( treeType = = SINGLE_TREE | | treeType = =
  DUAL_TREE_LUMA ) {
    if( sps_bdpcm_enabled_flag &&
      cbWidth <= MaxTsSize && cbHeight <= MaxTsSize )
    intra_bdpcm_flag[ x0 ][ y0 ]
    if( intra_bdpcm_flag[ x0 ][ y0 ] )
      intra_bdpcm_dir_flag[ x0 ][ y0 ]
    else {
      if( sps_mip_enabled_flag &&
        ( Abs( Log2( cbWidth ) − Log2( cbHeight ) ) <= 2 ) &&
        cbWidth <= MdxTbSizeY && cbHeight <= MaxTbSizeY )
      intra_mip_flag[ x0 ][ y0 ]
      if( intra_mip_flag[ x0 ][ y0 ] )
        intra_mip_mode[ x0 ][ y0 ]
```

When intra_mip_flag [x0][y0] is 1, it indicates that the intra-prediction type of the current block is MIP. When intra_mip_flag [x0][y0] is 0, it indicates that the intra-prediction type of the current block is regular intra-prediction, not MIP. When intra_mip_flag [x0][y0] is absent, it may be inferred to be equal to 0. intra_mip_mode [x0] [y0] specifies the MIP mode used for the current block in the MIP.

Neighboring samples of the current coding block to be used to generate a prediction signal may be differently determined according to the MIP mode. As one instance, for a coding block having a size of 4×4, 35 MIP modes are available, and the neighboring samples to be used for generating prediction signals may be determined according to a range of modes as follows.

$$\begin{cases} \text{Left neighboring samples} & \text{for mode} < 12 \\ \text{Above neighboring samples} & \text{for mode} \geq 24 \\ \text{Left neighboring samples and} \\ \text{Above neighboring samples} & \text{otherwise} \end{cases}$$

When pixels of a current coding block have horizontal characteristics, it may be advantageous to generate the prediction signals using the left neighboring samples. Similarly, when pixels of the current coding block have vertical characteristics, it may be advantageous to generate the prediction signals using the above neighboring samples.

To select an MIP mode suitable for a directional characteristic of the block, the video encoder may be configured to apply regular modes of the intra-prediction to the block and calculate a distortion value of the block for each regular mode. When the distortion value of the horizontal prediction mode (e.g., INTRA_ANGULAR_14 to INTRA_ANGULAR_22) is less than that of the other modes, the horizontal direction may be determined as the dominant direction of the current coding block. Conversely, when the distortion value of the vertical prediction mode (e.g., INTRA_ANGULAR_46 to INTRA_ANGULAR_54) is less than that of the other modes, the vertical direction may be determined as the dominant direction of the current coding block.

When the horizontal direction is the dominant direction of the current coding block, the encoder allocates one of the MIP modes which use only left neighboring samples to the current coding block. On the other hand, when the vertical direction is the main direction, the encoder may allocate one of the MIP modes which use only above neighboring samples to the current coding block.

Hereinafter, for simplicity, a boundary vector and a method of determining predicted samples from the boundary vector will be described for a case of using left neighboring samples and a case of using above neighboring samples. When using both the left and above neighboring samples, the process may be substantially the same as described with reference to FIG. 5.

2-1. Boundary Vector Generation—Using Left Neighboring Samples (S620)

Figure 7A:
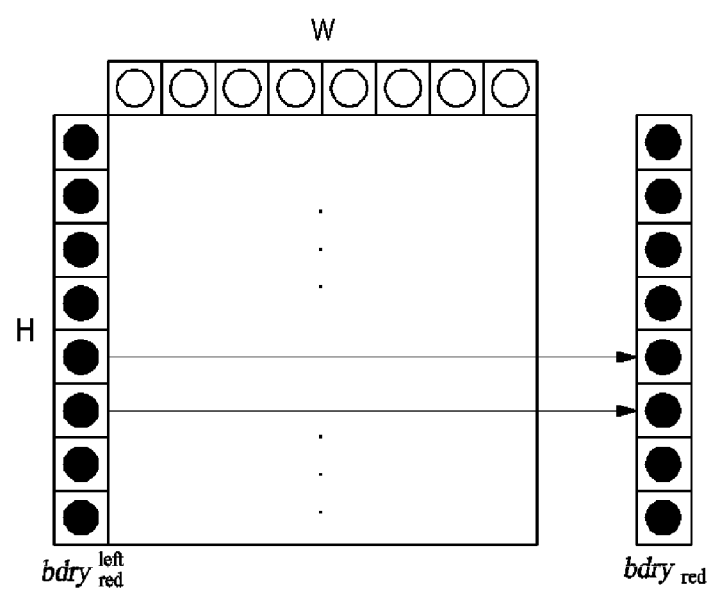
FIGS. 7A to 7C are conceptual diagrams illustrating an exemplary method of constructing a boundary vector that is input to matrix-vector multiplication using left neighboring samples.
Figure 7B:
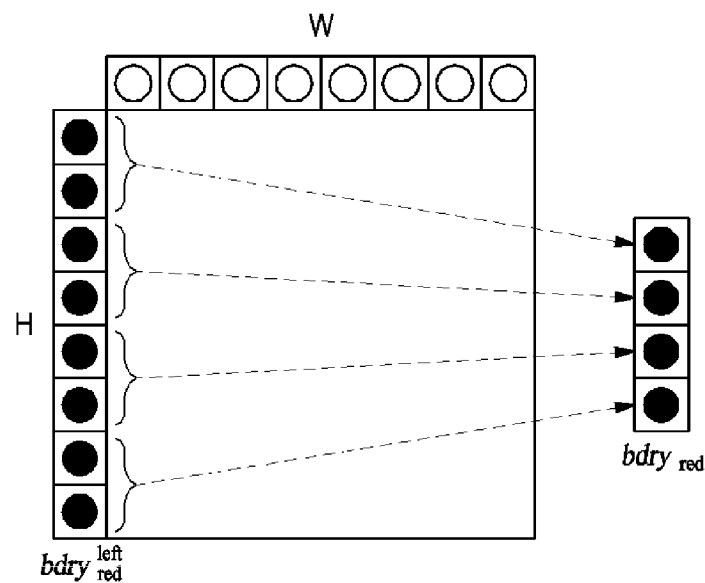
Figure 7C:
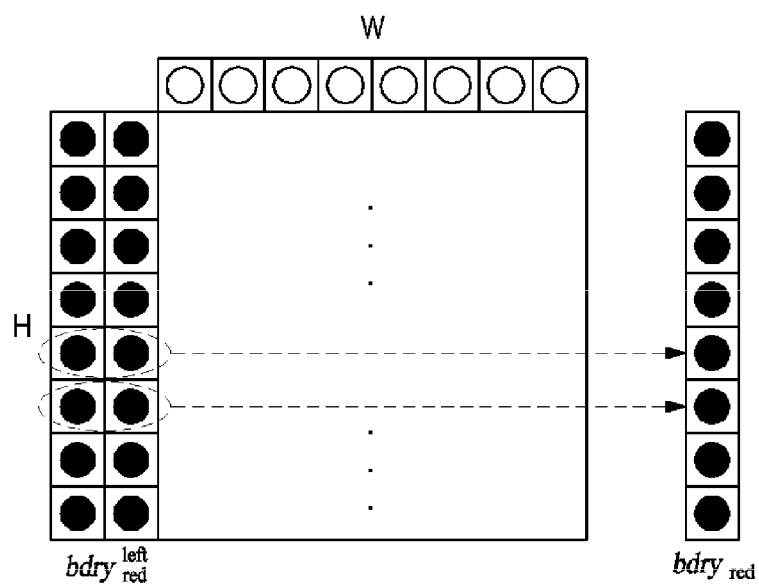

FIGS. 7A to 7C are conceptual diagrams illustrating an exemplary method of constructing a boundary vector that is input to matrix-vector multiplication using left neighboring samples. As an example, as illustrated in FIG. 7A, when the size (height) of the current coding block is the same as the size of the boundary vector $bdry_{red}$, the boundary vector $bdry_{red}$ of the same size may be filled using the left neighboring sample set $bdry^{left}$. For example, each of the left neighboring samples may be included in the entry of the boundary vector.

As another example, as illustrated in FIG. 7B, the boundary vector $bdry_{red}$ may be filled by calculating an average of two pixels in each row using two left columns adjacent to the coding block. As still another example, as illustrated in FIG. 7C, the boundary vector $bdry_{red}$ may be filled using a down-sampled sample set b y Left red obtained from the left neighboring sample set $bdry^{left}$. $bdry_{red}^{left}$ may be obtained by averaging $bdry^{left}$ for every two samples.

Depending on the size of the coding block $bdry^{left}$ and $bdry_{red}^{left}$ may be used adaptively. For example, as shown in the equation below, when H<=8, $bdry^{left}$ is used. Otherwise, $bdry_{red}^{left}$ may be used.

$$bdry_{red} = \begin{cases} [bdry^{left}] & \text{for } H \leq 8 \\ [bdry_{red}^{left}] & \text{otherwise} \end{cases}$$

2-2. Boundary Vector Generation—Using Above Neighboring Samples (S620)

Figure 8A:
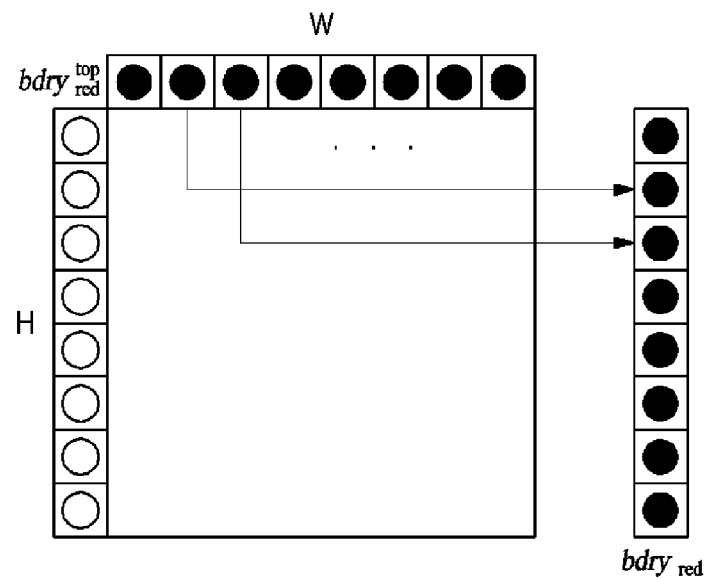
FIGS. 8A to 8C are conceptual diagrams illustrating an exemplary method of constructing a boundary vector that is input to a matrix-vector multiplication operation using above neighboring samples.
Figure 8B:
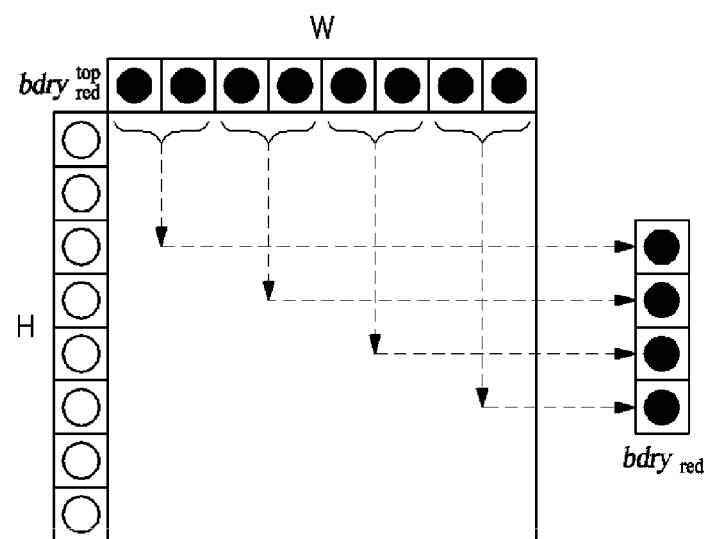
Figure 8C:
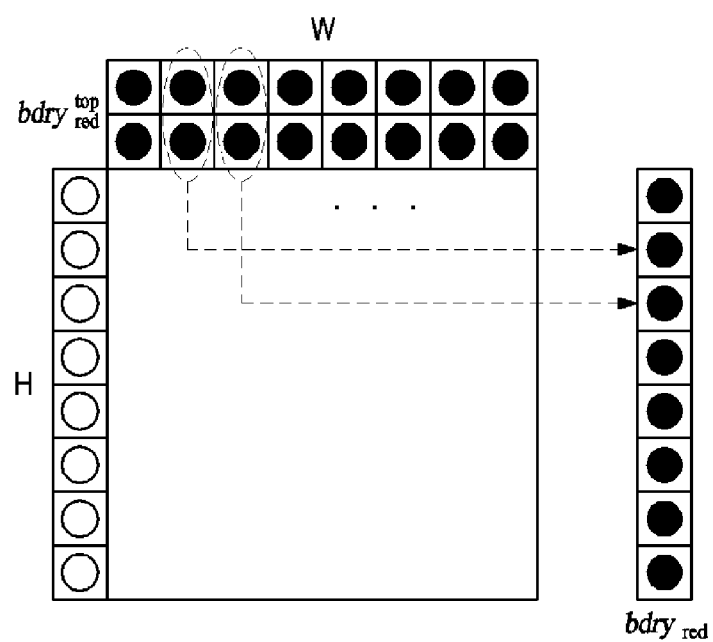

FIGS. 8A to 8C are conceptual diagrams illustrating an exemplary method of constructing a boundary vector that is input to a matrix-vector multiplication operation using above neighboring samples. As an example, as illustrated in FIG. 8A, when the size (width) of the current coding block is the same as the size of the boundary vector $bdry_{red}$, the boundary vector $bdry_{red}$ of the same size may be filled using a above neighboring sample set. For example, each of the above neighboring samples may be included in the entry of the boundary vector.

As another example, as illustrated in FIG. 8B, the boundary vector $bdry_{red}$ may be filled by calculating an average of two pixels in each column using two above rows adjacent to the coding block. As still another example, as illustrated in FIG. 8C, the boundary vector $bdry_{red}$ may be filled using a down-sampled sample set $bdry_{red}^{top}$ obtained from the above neighboring sample set $bdry^{top}$. Additionally, $bdry_{red}^{top}$ may be obtained by averaging every two samples of $bdry^{top}$.

Depending on the size of the coding block, $bdry^{top}$ and $bdry_{red}^{top}$ may be used adaptively. For example, as shown in the equation below, when H<=8, $bdry^{top}$ may be used. Otherwise, $bdry_{red}^{top}$ may be used.

$$bdry_{red} = \begin{cases} [bdry^{top}] & \text{for } H \leq 8 \\ [bdry^{top}_{red}] & \text{otherwise} \end{cases}$$

3. Matrix-Vector Multiplication and Offset Addition (S630)

The video decoder is configured to perform matrix-vector multiplication on the boundary vector $bdry_{red}$ and adds an offset vector to it. The matrix A and the offset vector b may be determined according to the decoded MIP mode k. As a result, a prediction signal of the original block or a sub-sampled prediction signal $pred_{red}$ is generated. $pred_{red}$ is calculated as follows.

$$pred_{red} = A \cdot bdry_{red} + b$$

Here, the size of $pred_{red}$ is $W_{red} \times H_{red}$.

When a boundary vector input to the matrix-vector multiplication is constructed using left neighboring samples, $W_{red}$ and $H_{red}$ may be determined according to the size of the coding block as follows.

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } H \leq 8 \\ 8 & \text{for } H > 8 \end{cases}$$

When a boundary vector input to the matrix-vector multiplication is constructed using above neighboring samples, $W_{red}$ and $H_{red}$ may be determined according to the size of the coding block as follows.

$$W_{red} = \begin{cases} 4 & \text{for } W \leq 8 \\ 8 & \text{for } W > 8 \end{cases}$$

$$H_{red} = \begin{cases} 4 & \text{for } \max(W, H) \leq 8 \\ \min(H, 8) & \text{for } \max(W, H) > 8 \end{cases}$$

Interpolation is required when the size of generated $pred_{red}$ is less than the number of samples of the coding block.

4. Linear Interpolation (S640)

Figure 9:
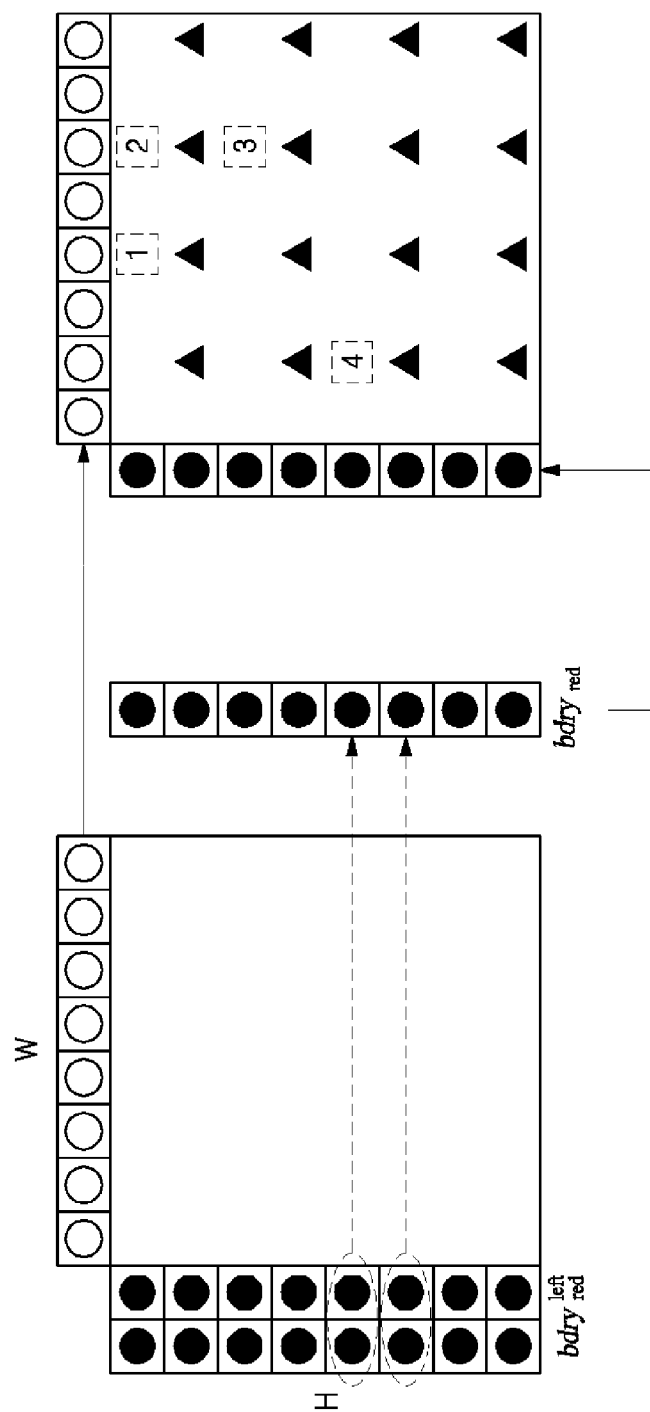
FIG. 9 shows left neighboring samples, a boundary vector, and predicted samples predicted therefrom.

FIG. 9 shows left neighboring samples, a boundary vector, and predicted samples obtained therefrom. In FIG. 9, pixels indicated by triangles in the prediction block predSamples[x][y] for the current coding block have values allocated from the generated $pred_{red}$. Referring to FIG. 9, various interpolation methods may be used to determine empty pixels in the prediction block predSamples[x][y].

For example, as in the case of pixel 1, a value of an empty pixel may be determined using left neighboring sample, above neighboring sample, and the value of $pred_{red}$ allocated below the empty pixel. As another example, as in the case of pixel 2, an empty pixel value may be determined using an above neighboring sample and the value of $pred_{red}$ allocated below the empty pixel. As another example, as in the case of pixel 3, an empty pixel value may be determined using the two values of $pred_{red}$ allocated above and below the empty pixel. As another example, as in the case of pixel 4, an empty pixel value may be determined using the left neighboring sample, and the two values of $pred_{red}$ allocated above and below the empty pixel.

Figure 10:
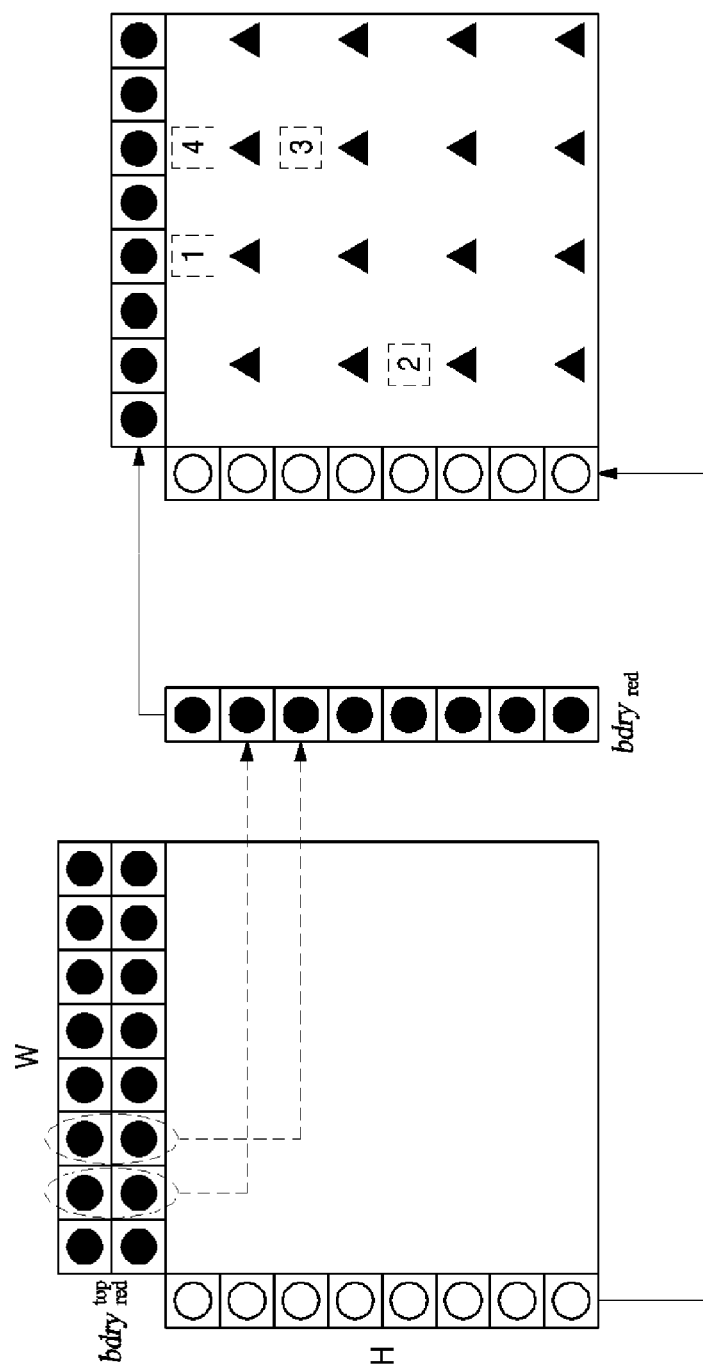
FIG. 10 shows above neighboring samples, a boundary vector, and predicted samples predicted therefrom.

FIG. 10 shows above neighboring samples, a boundary vector, and predicted samples obtained therefrom. In FIG. 10, pixels indicated by triangles in the prediction block predSamples[x][y] for the current coding block have values allocated from generated $pred_{red}$.

Referring to FIG. 10, various interpolation methods may be used to determine empty pixels in the prediction block predSamples[x][y]. For example, as in the case of pixel 1, an empty pixel value may be determined using the left neighboring sample, the above neighboring sample, and the value of $pred_{red}$ allocated below the empty pixel. As another example, as in the case of pixel 2, an empty pixel value may be determined using the left neighboring sample, two values of $pred_{red}$ allocated above and below the empty pixel. As another example, as in the case of pixel 3, an empty pixel value may be determined using the two values of $pred_{red}$ allocated above and below the empty pixel. As another example, as in the case of pixel 4, an empty pixel value may be determined using the above neighboring sample and the value of $pred_{red}$ allocated below the empty pixel.

Unlike the examples illustrated in FIGS. 9 and 10, to determine empty pixels in the prediction block predSamples[x][y], the above original reference samples $bdry^{top}$ may be allocated to predSamples[x][−1], and the left original reference samples $bdry^{left}$ may be allocated to predSamples[−1][y]. In the embodiment above, a scheme of selectively using neighboring samples of the current block according to the MIP mode is introduced such that the directionality of the block may be considered in generating a prediction block based on MIP.

According to another aspect of the present disclosure, instead of varying the neighboring sample set used to generate a boundary vector according to the MIP mode, the values of the matrix A and the offset b be applied to the boundary vector may be modified.

The matrix A and the offset b applied to matrix-vector multiplication and offset addition for a boundary vector may be divided into two parts as follows.

$$pred_{red} = A \begin{pmatrix} bdry^{left}_{red} \\ bdry^{top}_{red} \end{pmatrix} + (b)$$

$$pred_{red} = (A1|A2) \begin{pmatrix} bdry^{left}_{red} \\ bdry^{top}_{red} \end{pmatrix} + \begin{pmatrix} b1 \\ b2 \end{pmatrix}$$

When the values of A2 and b2 are approximated to 0, the prediction signal $pred_{red}$ is mainly affected by the left neighboring pixel $bdry^{left}_{red}$, which may be useful for a block in which the texture of the block has horizontal directionality. When the values of A1 and b1 are approximated to 0, the prediction signal $pred_{red}$ is mainly affected by the above neighboring pixel $bdry^{top}_{red}$, which may be useful for a block in which the texture of the block has vertical directionality.

The video encoder and decoder may use the modified values of the matrix A and the offset b to be applied to the boundary vector according to the MIP mode of the current block. For example, for a 4×4 CU, 35 MIP modes may be available, and the values of the matrix A and the offset b to be applied to the boundary vector may be modified according to the range of the mode.

$$\begin{cases} A2 \text{ and } b2 \cong 0 & \text{for mode} < 12 \\ A1 \text{ and } b2 \cong 0 & \text{for mode} \geq 24 \\ \text{Use } A \text{ and } b & \text{otherwise} \end{cases}$$

As described above, VVC draft 5 supports up to 35 MIP modes according to the size and shape of a CU. For example, 35 modes are available for a CU with max(W, H)<=8 && W*H<32, 19 prediction modes are available for a CU having max(W, H)=8, and 11 prediction modes are available for a CU having max(W, H)>8. In addition, a pair of modes (two modes) may share a matrix and offset vector to reduce memory requirements. For example, for a 4×4 coding block, mode 19 uses a transposed matrix of the matrix assigned to mode 2. Furthermore, by concatenating $bdry_{red}^{top}$ and $bdry_{red}^{left}$ in an order determined according to the MIP mode and the size of the block, a boundary vector $bdry_{red}$ to be input to the vector-matrix multiplication is generated.

An improved approach may be used that may achieve substantially equivalent levels of coding efficiency while reducing complexity. According to another aspect of the present disclosure, instead of the existing scheme in which one mode uses the transpose of the matrix used by the other mode, a new scheme configured to change the order of concatenating $bdry_{red}^{top}$ and $bdry_{red}^{left}$ constituting a boundary vector $bdry_{red}$ used for vector-matrix multiplication for each mode may be used. The video encoder may signal a syntax element indicating an order in which $bdry_{red}^{top}$ and $bdry_{red}^{left}$ are concatenated to constitute the boundary vector $bdry_{red}$ for each mode. According to this scheme, the number of available MIP modes may be reduced by half compared to the conventional method, and coding complexity in terms of boundary vector generation and vector-matrix multiplication may be reduced.

As described in relation to the syntax structure of Table 5, transform_skip_flag, which is a syntax element related to skipping transform, is signaled for each of transform units that satisfies certain conditions. When transform_skip_flag is not TRUE, tu_mts_idx, which is a syntax element related to multiple transform selection, must be transmitted according to flags (sps_explicit_mts_inter_enabled_flag, sps_explicit_mts_intra_enabled_flag) in the SPS, and thus a burden is applied regarding the number of bits to be transmitted in the bitstream.

However, the multiple transform selection and the transform skip are closely related to the characteristics of the residual signal, and thus it may not be efficient to always signal the transform-related syntax elements regardless of the prediction mode used in the block. It is noted that considering the MIP process including the averaging operation and the interpolation operation, the residual signal of the block to which MIP is applied has low frequency components which are dominant in the transform domain, and that it is likely that MIP will not be applied to a block having a low correlation between pixels, such as a block containing complex motion and texture. Therefore, it is likely that transform skip is not applied to a block for which MIP is used.

In view of the above, the approach of always signaling tu_mts_idx, which is a syntax element related to multitransform selection, and transform_skip_flag, which is a syntax element related to transform skipping regardless of whether MIP is applied to a block may not be very efficient. According to an aspect of the present disclosure, signaling of transform-related syntax elements may be omitted depending on whether MIP is applied, and the omitted syntax elements may be implicitly inferred by the video decoder.

In an embodiment, the MTS technique may be implicitly applied according to the MIP flag. As shown in the table below, transform_skip_flag and tu_mts_idx may be coded only when intra_mip_flag is not TRUE. When intra_mip_flag is TRUE, transform_skip_flag is inferred to be 0, tu_mts_idx is also inferred to be 0, and implicit MTS is inferred to be applied. Accordingly, the transform kernels in the horizontal and vertical directions may be determined according to the block size. In the syntax below, graying of elements is used to indicate potential changes in the syntax or provide understanding thereof.

TABLE 8

| | Descriptor |
|---|---|
| transform_unit( x0, y0, tbWidth, tbHeight, treeType, subTuIndex ) { | |
|   (omitted) | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = | |
|     ISP_NO_SPLIT ) && ( !cu_sbt_flag ) ) { | |
|     if( transform_skip_enabled_flag && tbWidth <= MaxTsSize && tbHeight <= MaxTsSize && (!intra_mip_flag[ x0 ][ y0 ])) | |
|       transform_skip_flag[ x0 ][ y0 ] | ae(v) |
|     if( (( CuPredMode[ x0 ][ y0 ] != MODE_INTRA && sps_explicit_mts_inter_enabled_flag ) | |
|       \| \| ( CuPredMode[ x0 ][ y0 ] = = MODE_INTRA && sps_explicit_mts_intra_enabled_flag )) | |
|     && ( !transform_skip_flag[ x0 ][ y0 ] ) && (!intra_mip_flag[ x0 ][ y0 ])) | |
|       tu_mts_idx[ x0 ][ y0 ] | ae(v) |
|   } | |
|   if( tu_cbf_luma[ x0 ][ y0 ] ) { | |
|     if( !transform_skip_flag[ x0 ][ y0 ] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   (omitted) | |

In another embodiment, the MTS technique may be explicitly applied according to the MIP flag. As shown in the table below, transform_skip_flag and tu_mts_idx may be coded only when intra_mip_flag is not TRUE. When intra_mip_flag is TRUE, transform_skip_flag is inferred to be 0, tu_mts_idx is explicitly signaled, and explicit MTS is applied. In the syntax below, graying of elements is used to indicate potential changes in the syntax or provide understanding thereof.

TABLE 9

| | Descriptor |
|---|---|
| transform_unit( x0, y0, tbWidth, tbHeight, treeType, subTuIndex ) { | |
|   (omitted) | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = | |
|     ISP_NO_SPLIT ) && ( !cu_sbt_flag ) ) { | |
|     if( transform_skip_enabled_flag && tbWidth <= MaxTsSize && tbHeight <= MaxTsSize && (!intra_mip_flag[ x0 ][ y0 ])) | |
|       transform_skip_flag[ x0 ][ y0 ] | ae(v) |
|     if( (( CuPredMode[ x0 ][ y0 ] != MODE_INTRA && sps_explicit_mts_inter_enabled_flag ) | |
|       \| \| ( CuPredMode[ x0 ][ y0 ] = = MODE_INTRA && sps_explicit_mts_intra)enabled_flag )) | |
|     && ( !transform_skip_flag[ x0 ][ y0 ] )) | |
|       tu_mts_idx[ x0 ][ y0 ] | ae(v) |
|   } | |
|   if( tu_cbf_luma[ x0 ][ y0 ] ) { | |

TABLE 9-continued

| | Descriptor |
|---|---|
| ```
    if( !transform_skip_flag[ x0 ][ y0 ] )
        residual_coding( x0, y0, Log2( tbWidth ), Log2(
            tbHeight ), 0 )
    else
        residual_ts_coding( x0, y0, Log2( tbWidth ),
            Log2( tbHeight ), 0 )
}
(omitted)
``` | |

In another possible embodiment, MIP may not be explicitly applied to a block having a low correlation between pixels, such as a block having a small size containing complex motion and texture. Transform skip (TS) may not be applied to the 4×4 CU to which MIP is applied. In addition, MIP may not be applied to the 4×4 CU to which TS is applied. In addition, MIP may not be applied to the 4×4 CU together with TS.

In a conventional approach, intra-prediction coding employing Most Probable Mode (MPM) may be used. For example, in HEVC, a list of three MPMs is configured from the intra-prediction modes of the left and above blocks. The drawback of this method is that more modes (intra-modes other than the MPM) belong to non-MPMs that need to be coded with more bits. Several methods have been proposed to extend the number of MPMs to 3 or more entries (e.g., 6 MPM modes). However, configuring such an MPM list with more entries may require more checks and conditions, which may make implementation more complex.

As described above, in VVC draft 5, as each MPM list is used for signaling of the MIP mode and the regular mode, the implementation may be complicated due to many checks and conditions such as a requirement for mapping between the MIP mode and the regular mode to configure an MIP list.

To maintain the complexity of configuration of an MPM list low, an MPM list including six MPM candidates may be configured using intra-prediction modes of a left neighboring block and an above neighboring block adjacent to the current block. The MPM candidates may include a default intra-prediction mode (e.g., a Planar mode), intra-prediction modes of neighboring blocks, and intra-prediction modes derived from the intra-prediction modes of the neighboring blocks. When the intra-prediction mode of the neighboring block is not used (for example, when the neighboring block is inter-predicted, or the neighboring block is located in a different slice or another tile), the intra-prediction mode of the neighboring block may be set to Planar.

According to the type of intra-prediction mode of the mode (Left) of the left block and the mode (Above) of the above block, it is divided into 4 cases. When Left and Above are different from each other, and the two modes are directional modes, 4 more cases may be included according to the difference of the Left and Above to generate an MPM list. In the table below, Max refers to the larger mode between the Left and the Above, and MIN refers to the smaller mode between the Left and the Above.

TABLE 10

| Condition | Detailed condition | MPM modes |
|---|---|---|
| Left mode and Above mode are directional mode and are the same | | {Planar, Left, Left − 1, Left + 1, Left − 2, Left + 2} |
| Left mode and Above mode are different, | Max − Min = 1 | {Planar, Left, Above, Min − 1, Max + 1, Min − 2} |
| | Max − Min > 62 | {Planar, Left, Above, Min + 1, |
| and both modes are directional modes | | Max − 1, Min + 2} |
| | Max − Min ≥ 2 | {Planar, Left, Above, Min + 1, Min − 1, Max + 1} |
| | 2 < Max − Min < 62 | {Planar, Left, Above, Min − 1, Min + 1, Max − 1} |
| Left mode and Above mode are different, and only one of them is directional mode | | {Planar, Max, Max − 1, Max + 1, Max − 2, Max + 2} |
| Both Left mode and Above mode are non-directional modes (i.e., Planar or DC) | | {Planar, DC, Angular50, Angular18, Angular46, Angular54} |

Due to the characteristics of the MIP technique including the averaging operation and the interpolation operation, the residual signal of a block to which MIP is applied may have a low frequency component dominant in the transform domain. Note that this residual characteristic is similar to the residual signal of the block to which the planar mode or DC mode is applied. Therefore, in deriving the MPM list of blocks coded in the regular intra-prediction mode, it may be useful to consider the similarity of such residual signals.

According to an aspect of the present disclosure, in deriving an MPM list for a block (i.e., a regular block) coded in the regular intra-prediction mode, when the neighboring block is coded in an MIP mode, the intra-prediction mode of the neighboring block may be regarded as a planar mode (or DC mode). As an example, when the MIP mode is applied to a neighboring block, the planar mode (or DC mode) may be added to the MPM list in place of the MIP mode of the neighboring block.

Similarly, even when a chroma DM (direct mode) is derived, if MIP is applied to a collocated luma block, the intra-prediction mode of the luma block may be regarded as the planar mode (or DC mode), instead of using a mapping table between the MIP mode and the regular mode. Accordingly, the encoder parses a syntax element specifying an intra-prediction mode for a chroma block, and the syntax element may indicate that the intra-prediction mode of the chroma block employs the intra-prediction mode of the collocated luma block. In such case, when MIP is applied to the collocated luma block, the intra-prediction mode of the luma block may be regarded as the planar mode (or DC mode). In other words, when MIP is applied to a collocated luma block in the chroma direct mode (DM), it may be determined that the intra-prediction mode of the chroma block is the planar mode (or DC mode).

The video encoder may signal a 1-bit flag (e.g., mpm_flag) indicating whether the intra-prediction mode of the current block corresponds to MPM. Typically, when the intra-prediction mode of the current block corresponds to MPM, an MPM index indicating one of 6 MPMs is additionally signaled. Note that in the table above, the planar mode is always included in the MPM list. Therefore, it may be efficient for the encoder to explicitly signal whether the intra-prediction mode of the current block is the planar mode (e.g., using a 1-bit flag) and to additionally signal an MPM index indicating one of the other five MPMs when the intra-prediction mode of the current block is the same as one of the other five MPMs. When the intra-prediction mode of the current block does not correspond to any MPM, a syntax element indicating one of the remaining 61 non-MPMs excluding the 6 MPMs may be encoded using a truncated binary code.

Figure 11:
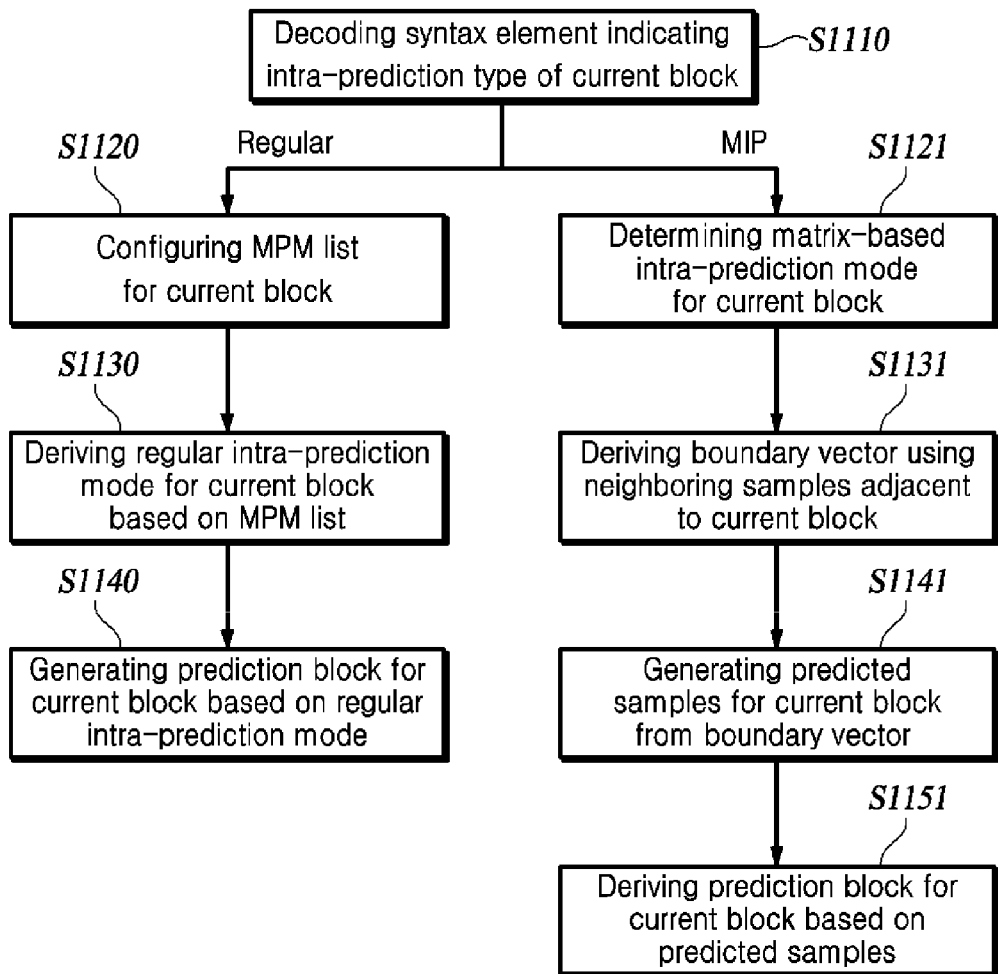
FIG. 11 is a flowchart illustrating a method of decoding video data according to an embodiment of the present disclosure.

FIG. 11 is a flowchart illustrating a method of decoding video data according to an embodiment of the present disclosure. The video decoder may be configured to decode a syntax element indicating an intra-prediction type of a current block of video data from a bitstream (S1110). Intra-prediction types include matrix based intra prediction (MIP) and regular intra prediction. The syntax element may be a truncated binary code specifying one of a plurality of MIP modes allowed for the size and shape of the current block.

The video decoder may be configured to generate a prediction block for the current block by selectively performing MIP or regular intra-prediction based on the intra-prediction type of the current block. As a part of generating a prediction block for the current block by performing regular intra-prediction, the video decoder may be configured to perform the following operations (S1120 to S1140). The video decoder may configure an MPM list for the current block by deriving Most Probable Mode (MPM) candidates based on the regular intra-prediction modes of the neighboring blocks adjacent to the current block (S1120), and derive a regular intra-prediction mode for the current block based on the MPM list (S1130). In deriving MPM candidates based on the regular intra-prediction modes of the neighboring blocks, the video decoder may be configured to set (regard) the regular intra-prediction mode of the neighboring block as the PLANAR mode when the intra-prediction type of the neighboring block is matrix-based intra-prediction. The decoder may be configured to generate a prediction block for the current block based on the regular intra-prediction mode of the current block (S1140).

As a part of generating a prediction block for the current block by performing matrix-based intra-prediction, the video decoder may be configured to perform the following operations (S1121 to S1151). The video decoder may be configured to decode a syntax element indicating a matrix-based intra-prediction mode for the current block from the bitstream to determine the matrix-based intra-prediction mode for the current block (S1121). The video decoder may be configured to derive a boundary vector using neighboring samples adjacent to the current block based on the size and shape of the current block (S1131), and generate predicted samples for the current block based on matrix-vector multiplication between a matrix predefined for the matrix-based intra-prediction mode for the current block and the boundary vector (S1141). The video decoder may be configured to derive the prediction block for the current block by performing linear interpolation and clipping based on the predicted samples (S1151).

The video decoder may be configured to derive the boundary vector from one or two sets selected from between a set of left neighboring samples and a set of above neighboring samples adjacent to the current block, depending on the matrix-based intra-prediction mode for the current block. The video decoder is configured to decode, from the bitstream, a syntax element indicating the concatenation order of first entries of the boundary vector derived from left neighboring samples adjacent to the current block and second entries of the boundary vector derived from the above neighboring samples adjacent to the current block. The video decoder may be configured to generate the boundary vector by concatenating the first entries and the second entries according to the indicated concatenation order.

The entries of the boundary vector may be filled with values down-sampled from the left neighboring samples adjacent to the current block or with the left neighboring samples adjacent to the current block according to the size and shape of the current block. The video decoder may allocate predicted samples to positions in a prediction block to derive the prediction block for the current block based on the predicted samples. To generate predicted sample values for positions to which predicted samples are not allocated in the prediction block, linear interpolation may be performed on the predicted samples, the left neighboring samples adjacent to the current block, and the above neighboring samples adjacent to the current block.

It should be understood that the exemplary embodiments described above may be implemented in many different ways. The functions or methods described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method of encoding video data, comprising:
   encoding, into a bitstream, a syntax element indicating an intra-prediction type of a current luma block of the video data, the intra-prediction type being indicated from among matrix based intra-prediction (MIP) and regular intra-prediction;
   generating a prediction block for the current luma block by selectively performing the MIP or the regular intra-prediction based on the intra-prediction type of the current luma block;
   generating a residual block of the current block using the predicted block; and
   encoding residual data which specifies the residual block,
   wherein the generating of the prediction block for the current luma block by performing the regular intra-prediction includes:
      determining a regular intra-prediction mode for the current luma block,
      deriving Most Probable Mode (MPM) candidates based on a regular intra-prediction mode of each of neighboring blocks adjacent to the current luma block to configure an MPM list for the current luma block, wherein the regular intra-prediction mode of the neighboring block is set as a PLANAR mode when an intra-prediction type of the neighboring block is the MIP; and
      encoding, into the bitstream, at least one syntax element indicating the regular intra-prediction mode for the current luma block based on the MPM list, and wherein the generating of the prediction block for the current luma block by performing the MIP includes:
encoding, into the bitstream, a syntax element indicating an MIP mode for the current luma block;
deriving a boundary vector using neighboring samples adjacent to the current luma block based on a width and a height of the current luma block;
generating predicted samples for the current luma block based on matrix-vector multiplication between the boundary vector and a matrix predefined for the MIP mode; and
deriving the prediction block for the current luma block based on the predicted samples, and
wherein the deriving of the boundary vector using the neighboring samples adjacent to the current luma block includes:
encoding, into the bitstream, a syntax element indicating a concatenation order of first entries of the boundary vector derived from the left neighboring samples adjacent to the current luma block and second entries of the boundary vector derived from the above neighboring samples adjacent to the current luma block; and
concatenating the first entries and the second entries according to the concatenation order and thereby generating the boundary vector.

2. The method of claim 1, wherein the syntax element indicating the MIP mode for the current luma block is a truncated binary code which specifies one of a plurality of MIP modes allowed for the width and the height of the current luma block.

3. The method of claim 2, wherein the deriving of the boundary vector using the neighboring samples adjacent to the current luma block includes:
deriving the boundary vector from one or two sets selected from between a set of left neighboring samples and a set of above neighboring samples adjacent to the current luma block, depending on the MIP mode for the current luma block.

4. The method of claim 2, wherein entries of the boundary vector are derived based on down-sampled values from left neighboring samples adjacent to the current luma block or the left neighboring samples adjacent to the current luma block according to the width and the height of the current luma block.

5. The method of claim 2, wherein the deriving of the prediction block for the current luma block based on the predicted samples includes:
allocating the predicted samples to positions in the prediction block; and
generating predicted sample values for positions to which the predicted samples are not allocated in the prediction block, based on using linear interpolation for the predicted samples, left neighboring samples adjacent to the current luma block, and above neighboring samples adjacent to the current luma block.

6. A method for decoding video data, comprising:
decoding, from a bitstream, a syntax element indicating an intra-prediction type of a current luma block of the video data, the intra-prediction type being indicated from among matrix based intra-prediction (MIP) and regular intra-prediction;
generating a prediction block for the current luma block by selectively performing the MIP or the regular intra-prediction based on the intra-prediction type of the current luma block indicated by the syntax element;
decoding, from the bitstream, residual data which specifies a residual block of the current block; and
reconstructing the current block based on the predicted block and the residual block,
wherein the generating of the prediction block for the current luma block by performing the regular intra-prediction includes:
deriving Most Probable Mode (MPM) candidates based on a regular intra-prediction mode of each of neighboring blocks adjacent to the current luma block to configure an MPM list for the current luma block, wherein the regular intra-prediction mode of the neighboring block is set as a PLANAR mode when an intra-prediction type of the neighboring block is the MIP; and
deriving a regular intra-prediction mode for the current luma block based on the MPM list, and
wherein the generating of the prediction block for the current luma block by performing the regular intra-prediction includes:
decoding, from the bitstream, a syntax element indicating an MIP mode for the current luma block;
deriving a boundary vector using neighboring samples adjacent to the current luma block based on a width and a height of the current luma block;
generating predicted samples for the current luma block based on matrix-vector multiplication between the boundary vector and a matrix predefined for the MIP mode; and
deriving the prediction block for the current luma block based on the predicted samples, and
wherein the deriving of the boundary vector using the neighboring samples adjacent to the current luma block includes:
decoding, from the bitstream, a syntax element indicating a concatenation order of first entries of the boundary vector derived from the left neighboring samples adjacent to the current luma block and second entries of the boundary vector derived from the above neighboring samples adjacent to the current luma block; and
concatenating the first entries and the second entries according to the concatenation order and generating the boundary vector.

7. The method of claim 6, wherein the syntax element indicating the MIP mode for the current luma block is a truncated binary code which specifies one of a plurality of MIP modes allowed for the width and the height of the current luma block.

8. The method of claim 7, wherein the deriving of the boundary vector using the neighboring samples adjacent to the current luma block includes:
deriving the boundary vector from one or two sets selected from between a set of left neighboring samples and a set of above neighboring samples adjacent to the current luma block, depending on the MIP mode for the current luma block.

9. The method of claim 7, wherein entries of the boundary vector are derived based on down-sampled values from left neighboring samples adjacent to the current luma block or the left neighboring samples adjacent to the current luma block according to the width and the height of the current luma block.

10. The method of claim 7, wherein the deriving of the prediction block for the current luma block based on the predicted samples includes:

allocating the predicted samples to positions in the prediction block; and generating predicted sample values for positions to which the predicted samples are not allocated in the prediction block, based on using linear interpolation for the predicted samples, left neighboring samples adjacent to the current luma block, and above neighboring samples adjacent to the current luma block.

11. A non-transitory computer readable medium storing a bitstream containing encoded data for blocks of video data, the bitstream being generated by processes of:

encoding, into a bitstream, a syntax element indicating an intra-prediction type of a current luma block of the video data, the intra-prediction type being indicated from among matrix based intra-prediction (MIP) and regular intra-prediction;

generating a prediction block for the current luma block by selectively performing the MIP or the regular intra-prediction based on the intra-prediction type of the current luma block;

generating a residual block of the current block using the predicted block; and encoding residual data which specifies the residual block, wherein the generating of the prediction block for the current luma block by performing the regular intra-prediction includes:

determining a regular intra-prediction mode for the current luma block, deriving Most Probable Mode (MPM) candidates based on a regular intra-prediction mode of each of neighboring blocks adjacent to the current luma block to configure an MPM list for the current luma block, wherein the regular intra-prediction mode of the neighboring block is set as a PLANAR mode when an intra-prediction type of the neighboring block is the MIP; and encoding, into the bitstream, at least one syntax element indicating the regular intra-prediction mode for the current luma block based on the MPM list, and wherein the generating of the prediction block for the current luma block by performing the MIP includes:

encoding, into the bitstream, a syntax element indicating an MIP mode for the current luma block;

deriving a boundary vector using neighboring samples adjacent to the current luma block based on a width and a height of the current luma block;

generating predicted samples for the current luma block based on matrix-vector multiplication between the boundary vector and a matrix predefined for the MIP mode; and deriving the prediction block for the current luma block based on the predicted samples, and wherein the deriving of the boundary vector using the neighboring samples adjacent to the current luma block includes:

encoding, into the bitstream, a syntax element indicating a concatenation order of first entries of the boundary vector derived from the left neighboring samples adjacent to the current luma block and second entries of the boundary vector derived from the above neighboring samples adjacent to the current luma block; and concatenating the first entries and the second entries according to the concatenation order and thereby generating the boundary vector.

* * * * *